H. L. DOHERTY.
PROCESS OF TREATING COMBUSTIBLE GASES.
APPLICATION FILED MAR. 31, 1909.
964,901.
Patented July 19, 1910.
3 SHEETS—SHEET 1.
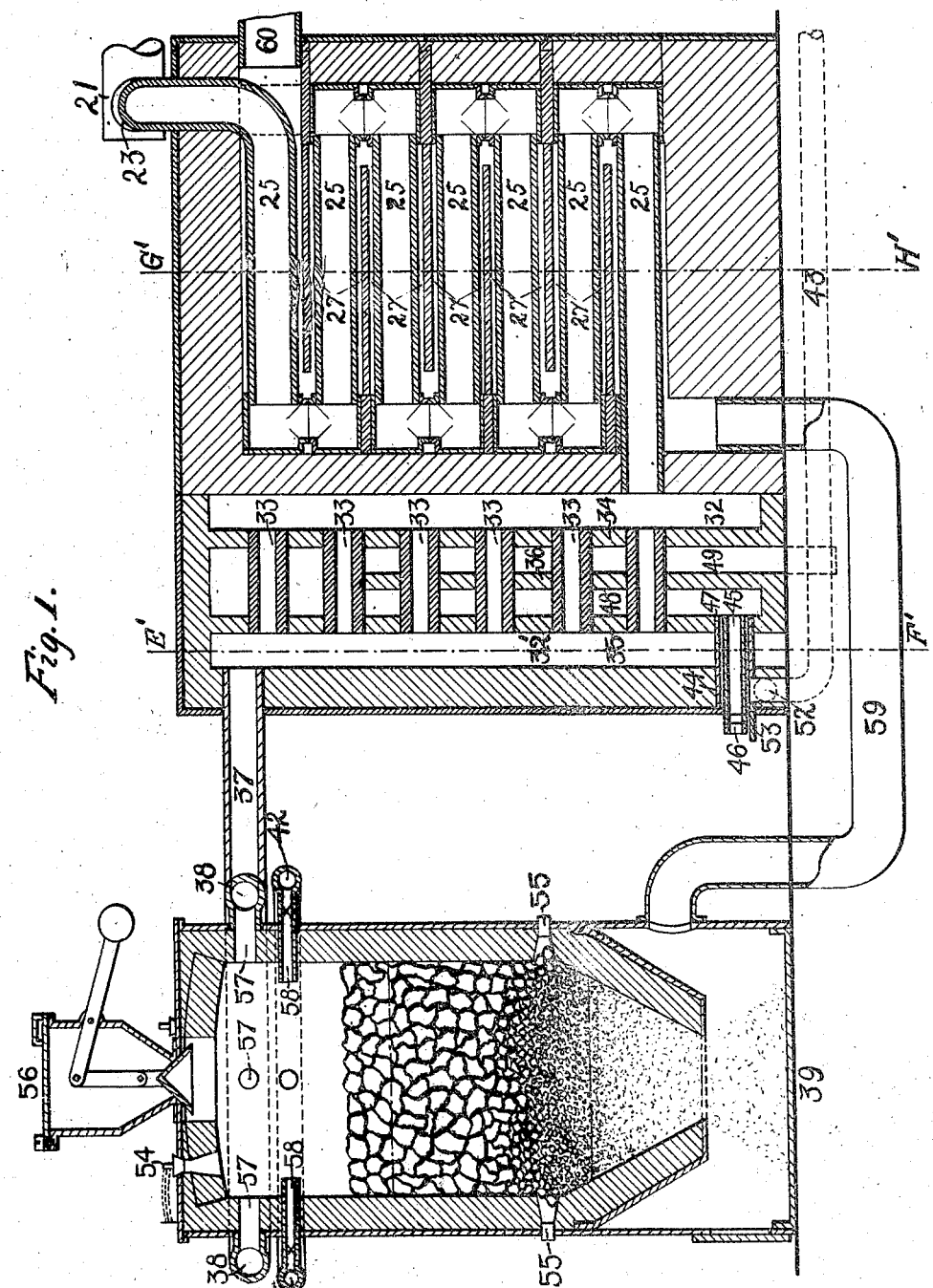
WITNESSES:
INVENTOR
Henry L Doherty,
BY
Frank S. Young,
ATTORNEY

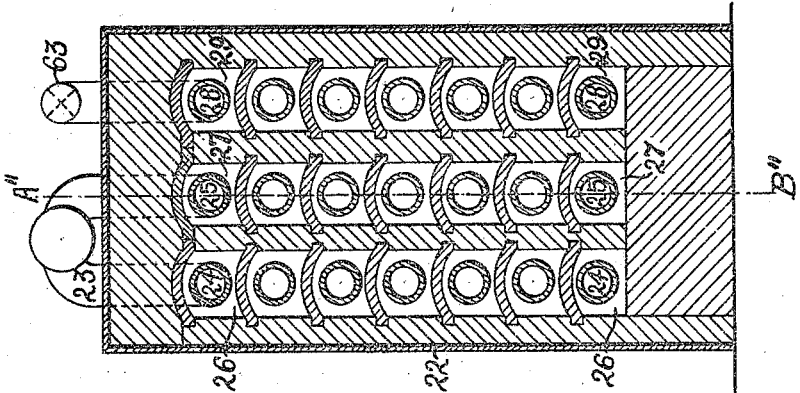
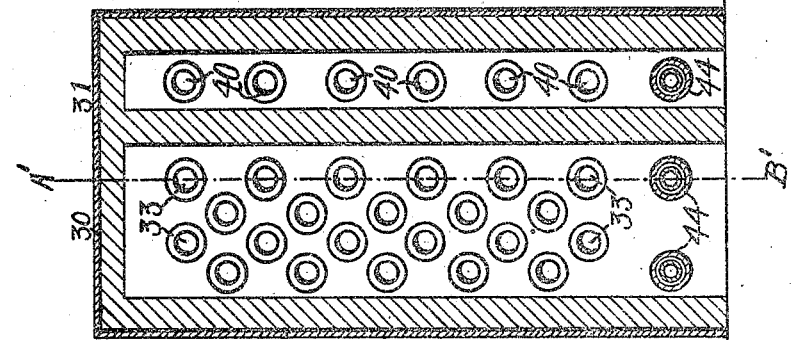
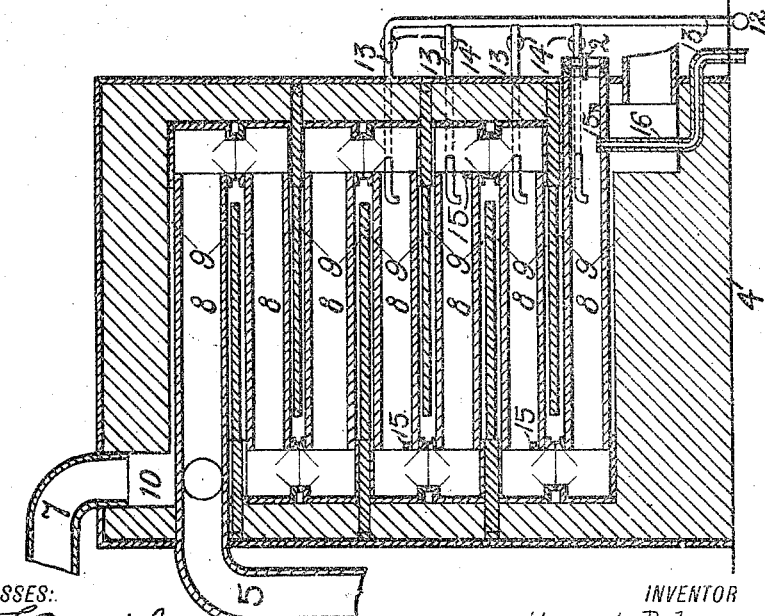

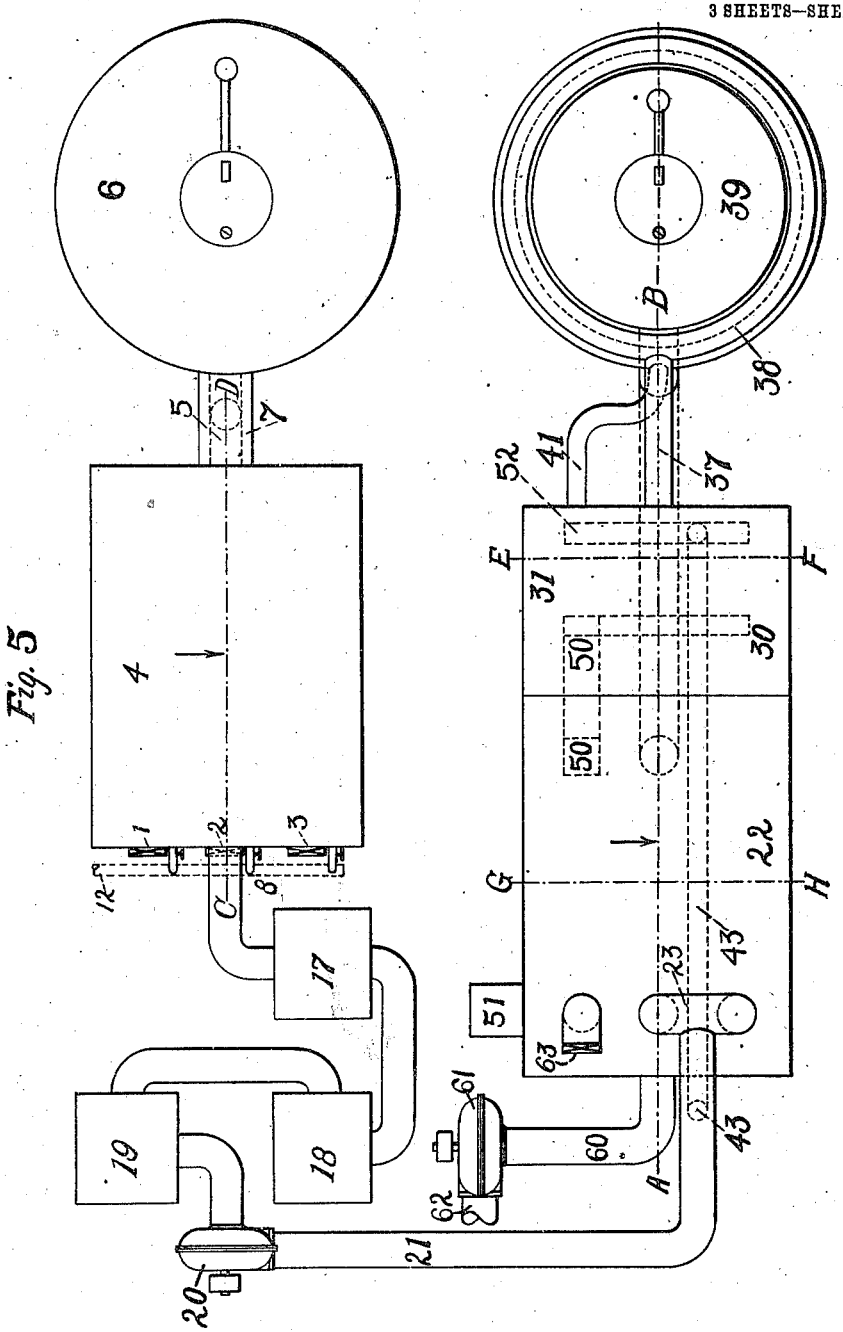

UNITED STATES PATENT OFFICE.

HENRY L. DOHERTY, OF NEW YORK, N. Y.

PROCESS OF TREATING COMBUSTIBLE GASES.

964,901.

Specification of Letters Patent.　Patented July 19, 1910.

Application filed March 31, 1909. Serial No. 436,886.

*To all whom it may concern:*

Be it known that I, HENRY L. DOHERTY, a citizen of the United States, residing at New York city, in the county of New York and State of New York, have invented new and useful Improvements in Processes of Treating Combustible Gases, of which the following is a specification.

This invention relates to a process of producing gas, and consists of a method of treating combustible gases (such as blast furnace gases and what is known as Mond gas) containing an appreciable amount of carbon dioxid by preheating the gas to a temperature sufficient to supply the heat required for the dissociation of the carbon dioxid—or to a temperature as near to such temperature as is practicable—and then passing the preheated gas through the fuel bed of a down-draft producer, whereby, the contained carbon-dioxid is reduced to carbon monoxid with the production of a gas nearly free from carbon dioxid and which is particularly suitable for use in gas engine and high temperature work.

The object of my invention is to furnish a process for carrying out such treatment of the gas without the addition thereto of a large volume of inert nitrogen such as is unavoidably introduced into the gas in the method of carrying out such treatment, heretofore known.

As is well known, the presence of any large amount of carbon dioxid in a combustible gas reduces, to a very appreciable extent, the flame temperature obtainable in the combustion of such gas. This is due to the fact that part of the heat developed must go to raising the temperature of the inert and useless carbon dioxid. As the specific heat of carbon dioxid per unit volume is high this means that the heat available for raising the temperature of the necessary elements of the combustion is materially reduced. Besides carbon dioxid has a specific retarding action on the combustion itself, rendering it slow and producing a slow burning diffused flame of large volume instead of the concentrated intense flame produced by a rich gas free from carbon dioxid when burned by an adequate supply of air.

When furnace gas is burned to generate steam (in the manner in which it is generally utilized) the carbon dioxid which is always present has the effect of decidedly reducing the efficiency of the combustion. As explained above, it acts to render the combustion sluggish, and diffused. The result is that the gases come into contact with the comparatively cool tubes of the boiler before the gas has been thoroughly burned. Their temperature is, in this way, quickly reduced below that necessary to maintain combustion. The result is that the flue gases generally show a considerable amount of unburned carbon monoxid. In the case of so-called Mond gas, which is a gas made by the use in the producer of a large amount of water, the effects of its carbon dioxid are similar, although the high content of hydrogen renders them less noticeable.

The average composition of an iron blast furnace gas is, about, carbon monoxid 23%, carbon dioxid 12%, methane 2%, hydrogen 2%, water vapor 3% and nitrogen 58%. Mond gas has an average composition of, about, carbon monoxid 16%, carbon dioxid 12.4%, methane 2.2%, hydrogen 24%, nitrogen 45.4%.

The analysis given of the Mond gas is for the cooled gas which is therefore comparatively free from water vapor. Since this gas is invariably cooled before leaving the producer apparatus for the purpose of recovering the ammonia which it carries, while the blast furnace gas (when used to fire boilers) is always used hot, the comparison of the cold Mond gas with the hot blast furnace gas is a perfectly fair one.

From the facts mentioned above we can see that the efficiency of the utilization of these gases, could be greatly improved by even the simple removal of the high proportion of carbon dioxid. By my invention, however, instead of removing the carbon dioxid, I decompose it in contact with carbon at a high temperature forming two molecules of carbon monoxid for every molecule of carbon dioxid, thus actually enriching the gas and at the same time appreciably increasing its volume, as well as eliminating the carbon dioxid to a large extent.

In the drawings Figure 1, is a section of an apparatus suitable for applying my invention taken on a plane through the lines A B, Fig. 5, A' B' Fig. 3, and A'' B'' Fig. 4; Fig. 2 is a section through a recuperator, which is functionally connected with the gas producer proper, taken on a plane through the line C D of Fig. 5; Fig. 3 is a cross-section through the superheater on the line E F of Fig. 5 and E' F' of Fig. 1; Fig. 4 is a cross-section through the recuperator which is functionally connected with the enriching producer, on a plane through the line G H of Fig. 5 and G' H' of Fig. 1; Fig. 5 is a diagrammatic plan of the entire apparatus.

The method of operation is as follows:— Air enters the bottom flues of the recuperator 4 through the dampers 1, 2 and 3 which regulate the volume and distribution of the air passing into the recuperator. Passing through the air flues of 4 the air comes into contact with a layer of water which is maintained in the necessary number of flues to insure proper saturation of the air current. The hot gas from the producer passes through the gas flues enveloping the air flues, its direction of flow being parallel to but opposite in direction to the air current. The greater part of the sensible heat which the gas carries out of the producer is thus returned to the latter in the heated air and water vapor. The hot air-water vapor current after leaving the recuperator is introduced (in the usual type) into the lower part of the gas producer 6, through the pipe 5. Passing upward through the fuel bed in producer 6, the oxygen and part of the water of the air current react with the fuel therein and form "Mond" gas in the ordinary manner. This gas passes off from the producer 6 through the pipe 7 and thence through the gas flues of the recuperator 4.

In recuperator 4, 8 indicates the air flues. These consist of a number of horizontal sections joined alternately front and back with the adjacent flues above and below so as to form a continuous return-bend flue. As shown, the recuperator has three such flues but it is obvious that the number may be either increased or diminished without departing from the principle involved. The air flues are located in and enveloped by three larger parallel flues 9. These flues consist of horizontal sections joined alternately front and back so as to form continuous return-bend flues. The hot gas from the Mond producer, 6, enters the recuperator through the pipe 7 and is distributed to the flues 9 by the cross flue 10. The hot gas passes through the flues 9, surrounding the air flues 8, and gives up most of its sensible heat to the air passing through flues 8. The air enters the recuperator through the dampers 1, 2 and 3, passes through the flues 8 of the recuperator and thence to the producer 6. The recuperator 4 has a water-supply pipe 12 with connections 13, into the lower sections of flues 8. Valves 14 control the flow of water to the air flues.

In order to maintain as high a temperature differential, as possible, between the air current and gas current it is desirable to secure the evaporation of the water as low down in the recuperator as possible. For this reason, I introduce the water to the air flues at such a point that the air passing through the flues is loaded with the proper quantity of water. All the water evaporated in each flue is, preferably, run into the uppermost water pan in use and the pans below supplied by the overflow from this. Dams 15, in the flues having water connections insure the maintenance of a shallow layer of water in the flues and thus form water pans of the bottom of the sections. If the amount of evaporation is lower than is required, water is admitted to a section higher up in the recuperator. Drain pipes 16, are provided to carry away any excess of water from the lower flues. The cooled Mond gas leaving the recuperator then passes to the ordinary scrubbing towers, 17, 18 and 19, where the ammonia is removed from the gas. These towers do not necessarily differ from the ones at present in use. From 19 the gas is withdrawn by the exhauster 20 and forced through the pipe 21 to the recuperator 22. This recuperator is in reality two separate recuperators one for air and the other for gas, built, side by side, within the same shell. The section shown in Fig. 1 is through one of the gas flues, but the construction is identical on the air side.

23 is a cross connection between the two gas-flues 24 and 25 so that the gas flowing through 22 is divided between the two flues 24 and 25. The flues 24 and 25 are made up of horizontal sections, each section connected alternately front and back with the vertically adjacent flues, so as to form continuous return-bend flues. Enveloping these flues are return-bend flues 26 and 27 for the enriched gas. These latter flues are formed as shown by introducing staggered horizontal baffle walls in the recuperator so as to make the gaseous current passing through 26 and 27 take a path parallel to but in the opposite direction to the current passing through 24 and 25.

28 is the air flue and 29 the enveloping gas flue.

When the gas to be treated contains only such a proportion of $CO_2$ that the preliminary superheating of the gas is sufficient to furnish the heat requisite for the dissociation of its $CO_2$ the addition of air to the gas is omitted. In this case the secondary air recuperator and superheater is omitted.

The cold Mond gas and air passing—the gas through the flues 24 and 25 and the air through the flue 28—through the recuperator go next to their respective superheaters, 30 and 31. These are built within the same shell but are so arranged that there is no communication between the gas and air sides. The section shown in Fig. 1 is through the gas superheater 30, but the construction of 31 is precisely the same in principle. The gas enters a flue 32 on passing from the recuperator. This flue 32 extends across the full interior width of the superheater establishing communication with the small flues 33. These flues 33 are simply fire clay flues of small interior diameter piercing the walls 34 and 35 of the superheater, and also the baffle wall 36, and establishing communication between 32 and the similar flue 32'. The gas entering the flue 32 passes through the flues 33 into the flue 32', thence out through the pipe 37 to the gas bustle-pipe 38 of the enriching producer or reductor, 39. The air passes in a similar manner through the flues 40 of the air superheater and through the pipe 41 to the air bustle-pipe 42, of producer 39.

43 is a pipe tapped into the pipe 21 and diverting a portion of the Mond gas to the burners 44 of the superheaters. These burners have an air passage 45, with a damper 46, regulating the admission of air thereto. Surrounding 45 is an annular passage 47 for the passage of the gas. The air and gas mix and burn on their entrance to the combustion flue 48, the hot products of combustion passing upward around the flues 33, over the baffle wall 36 and down through the flue 49 to the flue 50, and thence to the hot gas flue of the air recuperator and from that to the stack 51. The burners are connected by a cross-flue 52, so that they are all supplied with gas by the pipe 43. Gates or dampers 53 control the supply of gas to the burners.

The enriching producer, 39, may be of any type suitable for operation with down draft in the manner hereinbelow explained. In the apparatus shown the producer 39 has a metal shell suitably lined with refractory material and having a refractory roof or arch to the fuel chamber. Suitable pokeholes, 54 and 55, are provided for giving access to the interior of the producer. A charging device 56, is provided for introducing the fuel into the producer. The highly heated Mond gas that is to be treated (enriched) is introduced into the upper part of the fuel chamber through the bustle-pipe 38 and connections 57. The heated air usually necessary to maintain the reaction in the producer is introduced through the bustle-pipe 42 and connections 58, the inner portions of the latter being of refractory material. The temperature in the fuel chamber being maintained at a high point a portion of the Mond gas is burned by the oxygen of the air, with the probable formation of water vapor and carbon monoxid. Owing to the high proportion of hydrogen in the Mond gas and the high velocity of the reaction between that element and oxygen it is probable that the oxygen of the air introduced burns principally according to the reaction, (1) $2H_2 + O_2 = 2H_2O$, rather than according to the reaction, (2) $2CO + O_2 = 2CO_2$.

Since the products of these combustions are dissociated again in the fuel bed of the producer, by the respective reactions, (3) $2H_2O + C_2 = 2H_2 + 2CO$ (4) $2CO_2 + C_2 = 4CO$, the net heat developed is the same in each case, since it is that due to the burning of equal weights of carbon to carbon monoxid. It is therefore a matter of indifference which reaction predominates.

The gases from the upper combustion chamber of the producer, 39, carrying the carbon dioxid introduced with the Mond or blast furnace gas and the water vapor and carbon dioxid produced by the combustion in the upper part of 39, pass downward and into the fuel bed of the producer. Here the highly incandescent carbon reacts with the water vapor and carbon dioxid according to reactions 3 and 4. In the case of the water vapor and carbon monoxid formed from the partial combustion of the gas, they have, in the combustion itself, furnished enough heat for their subsequent dissociation. Moreover, owing to the fact that the oxygen of the water and one-half of that of the carbon dioxid burns a portion of the fuel to carbon monoxid the net result of the combustion of the hydrogen and carbon monoxid and their subsequent dissociation is to liberate an amount of heat equal to that formed by the burning of the weight of carbon with which they react to carbon monoxid. This is the heat which serves to dissociate the carbon dioxid originally present in the untreated gas. Since the carbon dioxid requires, theoretically, about 1600 B. T. U. per pound of carbon dioxid so dissociated, and the net amount of heat, theoretically, liberated in the combustion, of the portion of the gas burned in upper part of 39 is about 3280 B. T. U. per pound of oxygen reacting, there is required theoretically to maintain the fuel bed of the enriching producer $\frac{1600}{3280} = .488$, or, say, 1/2 pound of oxygen for every one pound of carbon dioxid introduced with the Mond or blast furnace gas. This is on the assumption that the air and gas enter the producer 39 at the temperature of the fuel bed therein, say, 1700° to 1800° F. Now, by the preferred method of treatment, which I have herein revealed, I introduce the gas and air at the highest practicable temperature, say 2500° F. By this device I, at the expense of burning a small quantity of the untreated Mond gas, supply to the gaseous currents previous to their introduction into the producer 39, about 65% of the heat necessary for the dissociation of the carbon dioxid of the Mond gas. As a result I have reduced the theoretical amount of air necessary to maintain the temperature in 39 to that corresponding to 1/5 pound of oxygen per pound of carbon dioxid, or, say, one pound of air per pound of carbon dioxid originally present in the Mond or blast furnace gas. This would correspond to about .20 cu. ft. of air per cu. ft. of Mond gas. In order to meet the various radiation and conduction losses, however, it is necessary in practice to use at least .25 cu. ft. of air per cu. ft. of Mond gas when they are introduced into 39 at the given temperature, 2500° F. With gases containing less $CO_2$ than Mond gas of normal composition the quantity of air used in the enriching producer may be correspondingly lessened. When the $CO_2$ of the gas is comparatively low, it becomes possible to cut out the auxiliary air entirely and to maintain the reactions in the enriching producer entirely by the self-contained heat of the highly superheated gas.

The cooling of the crude Mond gas, or other gas, after it leaves the producer in which it was made should where practicable, be carried below 212° Fah. so as to condense and remove from the gas all the steam or water possible. The presence of steam in the gaseous current introduced into the enriching producer is in the highest degree objectionable and is to be avoided to the greatest possible extent.

Using the proportions of air and gas given, the finished gas would have about the following composition, viz.: carbon dioxid, 2.05%; carbon monoxid, 27.2%; hydrogen, 19.65%; methane, 1.8%; nitrogen, 49.3%. The gas would, at the same time, be increased in volume by about 20% and the calorific power per cu. ft. by, about, 10 to 12%.

One of the difficulties heretofore encountered in the enrichment of gases containing carbon dioxid has been, that, owing to the necessity of introducing air into or with the gas to maintain the temperature in the fuel bed of the secondary or enriching producer at a reacting temperature, part of the gas was, of necessity, burned in the lower part of the fuel bed, with the production of a high temperature at that zone where the ratio of ash to fuel is high and the consequent fusion or sintering of the ash. In addition, where the heat developed by the combustion of the oxygen of the air admitted to the producer, has, alone, been relied upon to maintain the temperature of the fuel bed, the large amount of nitrogen that must, of necessity, be introduced with the air results in a treated gas having a calorific value no higher, if as high, as the original gas.

In my improved method which I have herein revealed, and claimed, I make no attempt to accomplish what is in fact impracticable, i. e., the simultaneous introduction into a bed of ignited fuel of a combustible gas containing an appreciable amount of carbon dioxid and the air necessary for the generation of sufficient heat to balance the endothermic reaction which takes place with the carbon dioxid of the combustible gas, without burning part of the combustible constituents of such gas. In my method it is a matter of indifference whether the heat for maintaining the dissociating reactions is generated by the combustion of part of the gas itself or the carbon of the fuel bed, since the net thermal result is the same in either case. In my method, it is true, I develop as high, or even higher, temperature in the reductor or secondary producer at the point of introduction of the gas and air, but I do so under conditions which cause the local high temperature to facilitate the operation of the producer rather than retard the same. By introducing the gas and air at the upper surface of the fuel bed the local high temperature developed becomes an advantage. By this device, the freshly charged fuel is immediately subjected to a temperature which quickly distils off its volatile constituents, which must of necessity pass through the whole depth of the fuel bed. The result is that the tarry vapors are wholly broken down into permanent gases, which add greatly to the illuminating and calorific power of the gas when a bituminous coal is used in the reductor. It has, heretofore, been found very difficult to make use of bituminous coal owing to the difficulties caused by the tarry substances carried in suspension in the gas.

In the heretofore proposed methods of treating blast furnace gas for reduction of its carbon dioxid, the difficulties mentioned as following on the local high temperature caused by the combustion between the crude gas and the admixed air are not due to the high temperature of itself, but to the local development of such high temperature in the ash zone of the producer. In the unburned fuel the mineral matter which constitutes the ash occurs, for the most part, in very small particles, disseminated throughout the carbonaceous matter of the fuel. These particles are not in contact with each other but are, so to speak, separated or insulated from each other by the surrounding particles of carbonaceous matter. In such a position it is immaterial to how high a heat they may be subjected since they are isolated from one another. They may be more or less completely fused without th least danger of them agglomerating together to form clinker or slag. If then we introduce the combustible gas containing carbon dioxid, and the air required to thermally balance its reaction with the carbon of the fuel, in contact with the unburned fuel instead of in contact with the ash, it is a matter of indifference how high a temperature is produced. The temperature may be as high as it will and, yet, not cause any sintering or clinkering of the ash. With a sufficient depth of fuel there is, practically, no danger of the high temperature of the hottest layers of the fuel bed extending to the ash zone of the reductor, for the water vapor or carbon dioxid formed by the combustion, mentioned, in its passage through the fuel bed is again dissociated with the absorption of heat. There is, therefore, a progressive diminution of temperature from the top to the bottom of the fuel bed. The heat developed due to the reaction of the gas and air takes place in immediate contact with the part of the fuel bed whose potential reactive energy is the greatest. The higher the temperature at which the gases come into contact with the fuel the greater will be the speed and energy of the endothermic reaction taking place in the upper part of the fuel bed. There is thus secured an automatic regulation of the working of the reductor or producer, for, as stated, the development of an excessive temperature in any part of the fuel bed is, immediately, checked by the increased dissociation of the endothermically reacting constituent of the gas. On the other hand, if the temperature at any point tends to fall too low, the diminished dissociation of the carbon dioxid at that point lessens the heat abstracted from the fuel bed at that point and permits it to recover its normal temperature. This self-balancing action of the exothermic and endothermic reactions has a tendency to keep a much greater depth of the fuel bed at a reactive temperature than is the case in ordinary practice. With any given proportion of air and gas and a given rate at which they are passed through the fuel bed, there is, thus, a tendency to establish a definite temperature and downward temperature graduation in the mass of fuel. By properly regulating the proportion of air to gas and the velocity at which the current is forced through the fuel bed, it is possible to maintain the temperature conditions in the producer at any desired point.

The high temperature in the upper part of the fuel bed has an incidental advantage which considerably facilitates the operation of the enriching producer or reductor. The result of the high temperature is that the ash particles are fused within their carbonaceous envelop. As the burning fuel sinks through the shaft of the producer, it is becoming, continually, cooler and cooler until by the time the carbonaceous envelop of the ash particles has been burned away it has reached a temperature below the fusing point of the ash. The result is, that the ash instead of consisting of half fused masses of clinker, is of a decidedly sandy or granular nature, which greatly facilitates its removal from the producer, as well as keeps the ash bed in an open porous condition.

By introducing an efficient recuperator and evaporator between the Mond producer (where the crude gas is Mond gas instead of blast furnace gas) and the absorption towers I am able to restore to the Mond producer a much larger proportion of the heat carried out of it by the gas than can be done in the ordinary method of working. Besides the additional heat recovered enables me to dissociate more water in the producer with the result of producing a richer gas.

While in the foregoing description, I have selected for the purpose of illustrating my invention its specific application to Mond gas, it is evident that the process may be applied to the treatment of any combustible gas containing reducible quantities of carbon dioxid; that is, quantities sufficiently large to permit a useful amount of reduction by contact with hot carbon.

Where, as in the case of the treatment of blast furnace gas, the volume of gas is very large it is often advisable to use several reductor producers for treating the gas rather than a single one. When this is done I may either pass the gas through the producers in parallel (to borrow an electrical term) or in series, as may seem most desirable.

A great advantage of my method is, that I am enabled to use bituminous coals in the producer instead of coke or anthracite. The high temperature in the upper part of my fuel bed, and the fact that the products of distillation must, of necessity, pass through the whole mass of incandescent fuel insures a perfect breaking down of the hydrocarbon vapors into permanent gases, thus avoiding any trouble due to the tarry vapors that are ordinarily found in the gas when bituminous coals are used. Owing to this fact that I can make use of bituminous coal I obtain a gas having a much higher illuminating value than ordinary producer gas.

Where the gas is to be used for firing furnaces—such as reheating furnaces for example—this feature of my invention is of very great importance. The hydrocarbons of the coal have a practical enriching value far in excess of the actual increase which they cause in the calorific value of the gas. This is due to the fact that they cause the gas to burn with a flaming effect which by increasing the radiant effect of the combus tion greatly increases the quantity of heat transmitted to the charge in the furnace.

What I claim and desire to secure by Letters Patent is:—

1. The process of improving a combustible gas containing substantial quantities of reducible carbon dioxid which consists in passing such combustible gas, in admixture with air through a deep bed of ignited fuel in a down-draft producer, the proportion of air admixed with said gas being restricted to the quantity required to maintain the fuel bed in said producer at a reacting temperature by counterbalancing the cooling due to the reaction of said carbon dioxid upon said fuel.

2. The process of treating a combustible gas containing carbon-dioxid, which consists in removing from said gas substantially all of its condensible water-vapor, superheating said gas, and passing said superheated gas through the fuel-bed of a down-draft producer, said fuel bed being maintained at a temperature capable of reducing carbon dioxid.

3. The process of treating a combustible gas containing carbon-dioxid which consists in removing from said gas substantially all of its condensible water-vapor, superheating the major portion of said gas by burning the minor portion of said gas in a suitable superheater, and passing the superheated gas downward through a deep bed of fuel in a suitable inclosed chamber, said fuel bed being maintained at a sufficiently high temperature to reduce the carbon-dioxid of said gas by adding to said gas, previous to passing the same through said fuel bed, the minimum quantity of oxygen that will maintain said fuel bed at the desired temperature.

4. The process of improving a combustible gas containing carbon-dioxid, which consists in cooling said gas below 212° Fah. whereby the major portion of the water vapor contained by said gas is condensed therefrom, passing the major portion of said gas through a superheater, burning the minor portion of said gas in said superheater, whereby the said major portion of the gas is heated to a high temperature, and continuously passing the said superheated gas through a bed of incandescent fuel in a down-draft gas producer, sufficient air being mixed with said superheated gas before its passage through the fuel bed to maintain the latter at a temperature suitable for the reduction of more or less of the carbon dioxid introduced into the producer, and that formed therein, to carbon monoxid, the thickness of the fuel bed and the velocity of the draft current being so regulated that the reduction of the carbon-dioxid to monoxid is carried on to the extent desired up to the point at which the reacting system is in equilibrium.

5. The process of enriching a combustible gas containing one or more non-combustible constituents capable of being changed to combustible constituents through reaction with incandescent carbon which consists in passing a major portion of said gas through a recuperator, whereby it is heated by heat taken up from enriched gas, in passing said major portion of said gas through a superheater, in burning a minor portion of said gas in said superheater, whereby the temperature of the major portion of said gas is raised to a temperature superior to the temperature of reaction between said non-combustible constituents and carbon, in introducing said heated gas above the fuel bed of a down-draft producer, in adding to said heated gas a portion of air, said air having been previously heated by a portion of the products of combustion from the said minor portion of said combustible gas, in passing the resulting gases downward through the fuel bed in said producer, whereby the non-combustible gases formed by the air admitted and the reducible non-combustible gases of the said combustible gas, are reduced to combustible gases by reaction with the said fuel bed, in withdrawing the enriched gas from the lower part of said producer, and in passing it through the recuperator for heating the unenriched gas.

6. The process of making a rich producer gas which consists in heating air in a recuperator by the sensible heat of hot producer gas, in introducing an excess of water vapor into said heated air, in passing the current of heated air and water vapor through a bed of incandescent fuel, whereby a producer gas is made containing reducible non-combustible constituents, in passing said producer gas through said recuperator to heat another portion of air, in recovering the ammonia from said gas, in heating the major portion of said gas freed from ammonia in a recuperator heated by a previously enriched portion of said gas, in burning a minor portion of said gas to heat a superheater, in passing the major portion of said gas through said superheater whereby its temperature is raised to a point superior to that at which the reducible non-combustible constituents of the gas will react with carbon, in introducing said major portion of the gas into a down-draft producer, in passing said heated gas through the fuel bed of said producer, whereby more or less of the reducible non-combustible constituents of said gas are reduced to combustible constituents, in withdrawing the so enriched gas from the lower part of said down-draft producer and in passing it through the said recuperator to heat another portion of gas.

7. The process of improving combustible gas containing substantial amounts of reducible carbon dioxid by the reduction of said carbon dioxid which comprises heating such a gas to a temperature sufficient to compensate at least in part for the endothermic action of the contained carbon dioxid upon fuel and passing the heated gas downward through a deep bed of ignited fuel together with merely sufficient air to counterbalance any uncompensated endothermic action of said carbon dioxid upon said fuel.

8. The process of making gas which comprises producing "Mond gas" containing hydrogen and substantial amounts of carbon dioxid, recovering the ammonia therefrom, reheating the gas to a temperature sufficient to compensate at least in part for the endothermic action of the contained carbon dioxid upon fuel, passing the heated gas downward through a deep bed of ignited fuel together with merely sufficient air to counterbalance any uncompensated endothermic action and recovering the heat of outgoing gas to add to ingoing.

9. The process of improving combustible gas containing substantial amounts of carbon dioxid which comprises heating such gas by recovered heat from treated gas, superheating by heat from combustion of a portion of gas, passing said gas downward through a deep bed of ignited fuel in a secondary producer or reductor and recovering the heat from the treated gas to add to untreated gas, air being added to the gas prior to treatment in the reductor in the amount sufficient to counterbalance any endothermic cooling of the reductor fuel not compensated for by the sensible heat of such gas.

Signed at New York city, in the county of New York and State of New York, this 30th day of March, 1909.

HENRY L. DOHERTY.

Witnesses:
  LOUIS F. MUSIL,
  FRED I. SMITH.